United States Patent
Schlaug et al.

(10) Patent No.: US 9,925,914 B2
(45) Date of Patent: Mar. 27, 2018

(54) VEHICLE HEADLIGHT SYSTEM WITH ADAPTIVE LIGHT DISTRIBUTION

(71) Applicant: FORD GLOBAL TECHNOLOGIES, LLC, Dearborn, MI (US)

(72) Inventors: Christoph Schlaug, Inglebach (DE); Doemoetoer Gulyas, Cologne (DE); Michael Koherr, Euskirchen (DE)

(73) Assignee: Ford Global Technologies, LLC, Dearborn, MI (US)

(*) Notice: Subject to any disclaimer, the term of this patent is extended or adjusted under 35 U.S.C. 154(b) by 193 days.

(21) Appl. No.: 14/922,827

(22) Filed: Oct. 26, 2015

(65) Prior Publication Data

US 2016/0114720 A1    Apr. 28, 2016

(30) Foreign Application Priority Data

Oct. 24, 2014    (DE) .................. 10 2014 221 647

(51) Int. Cl.
| | |
|---|---|
| *F21V 19/02* | (2006.01) |
| *F21V 21/14* | (2006.01) |
| *B60Q 1/08* | (2006.01) |

(52) U.S. Cl.
CPC ........ *B60Q 1/085* (2013.01); *B60Q 2300/056* (2013.01); *B60Q 2300/45* (2013.01)

(58) Field of Classification Search
CPC .............. B60Q 1/085; B60Q 2300/056; B60Q 2300/45
USPC ........................................ 362/523, 508, 525
See application file for complete search history.

(56) References Cited

U.S. PATENT DOCUMENTS

| | | | |
|---|---|---|---|
| 2014/0029280 A1 | 1/2014 | Suckling et al. | |
| 2014/0307456 A1 | 10/2014 | Ishida et al. | |
| 2014/0355280 A1 | 12/2014 | Fujiyoshi | |
| 2015/0022083 A1 | 1/2015 | Huester et al. | |
| 2015/0028742 A1* | 1/2015 | Imaeda ................. | B60Q 1/143 |
| | | | 315/82 |

(Continued)

FOREIGN PATENT DOCUMENTS

| | | |
|---|---|---|
| DE | 102010046517 A1 | 4/2011 |
| DE | 102012002333 A1 | 8/2013 |

(Continued)

OTHER PUBLICATIONS

Machine English Translation of DE102010046517(A1) Woltermann Apr. 28, 2011.*

*Primary Examiner* — Elmito Breval
*Assistant Examiner* — Glenn Zimmerman
(74) *Attorney, Agent, or Firm* — Frank MacKenzie; Brooks Kushman P.C.

(57) ABSTRACT

An adaptive headlight system for a vehicle uses an adaptive headlight controller which controls one or more headlights so as to illuminate a scene visible to a vehicle driver. The controller causes the headlights to generate a frame-region within the scene which outlines an object detected by an object-detection system carried by the vehicle. The frame-region is illuminated at a reduced level relative to the areas of the scene inside and outside the frame-region, thereby creating a dark/light contrast, visible to the driver, between the frame-region and the scene. If the object-detecting system indicates that the object is a living being, the frame-region is located to cover a head of the living being so as to avoid visually dazzling the being.

18 Claims, 2 Drawing Sheets

(56) References Cited

U.S. PATENT DOCUMENTS

2016/0152174 A1\* 6/2016 Hagisato ................ B60Q 1/143
362/466

FOREIGN PATENT DOCUMENTS

| DE | 102013202370 A1 | 8/2014 |
| GB | 2497949 A | 7/2013 |
| JP | H07108873 A | 4/1995 |
| WO | 2015006793 A1 | 1/2015 |

\* cited by examiner

VEHICLE HEADLIGHT SYSTEM WITH ADAPTIVE LIGHT DISTRIBUTION

CROSS-REFERENCE TO RELATED APPLICATIONS

This application claims foreign priority benefits under 35 U.S.C. § 119(a)-(d) to DE 10 2014 221 647.8 filed Oct. 24, 2014, which is hereby incorporated by reference in its entirety.

TECHNICAL FIELD

The invention relates to an adaptive headlight system for an automotive vehicle in which one or more headlamp beams are generated and aimed with consideration for road features or objects detected by an on-board object-detection system. More specifically, the invention relates to such an adaptive headlight system in which some portion within the illuminated scene viewed by a vehicle driver is deliberately left non-illuminated in order to increase visual dark/light contrast.

BACKGROUND

The term "adaptive headlight system" is commonly applied to a system for a motor vehicle in which one or more lamps are controlled to generate and direct (or "steer") projected light to selectively illuminate a portion or portions of a scene (visible to a vehicle driver) with varying levels of illumination. Such a selective and varying illumination of portions of the scene viewed by the driver is commonly referred to as "adaptive light distribution."

DE 10 2012 002 333 A1 teaches a vehicle headlight system in which a light distribution contains at least one light beam which generates a limited illuminated area, similar to a spot-beam, in a predefined region in front of the vehicle. The light distribution can be composed of a plurality of different light beams to form a total light distribution. The light beams can be generated either by pivotable/steerable lighting modules or, such as if the light source is an LED array, by selectively switching the LED light sources on and off, wherein flashing effects can also be generated. A camera with image evaluation of the camera image such that a lane boundary and the position and profile thereof with respect to the vehicle are detected and are transmitted to a light control unit for the light distribution is located in the vehicle, said light control unit setting the light distribution in such a way that a lane boundary which is crossed by the vehicle is illuminated with higher illumination intensity than other regions of the field of vision.

DE 10 2010 046 517 A1 teaches a vehicle headlight system in which a lighting unit generates a specific light distribution which is sensed by an imaging sensing unit, wherein a horizontal and/or vertical light/dark boundary of the light distribution is determined by evaluating an image of the scene in front of the vehicle and is compared with reference values. In the case of deviations the lighting unit is adjusted automatically in order to avoid dazzling objects and other road users and to illuminate obstacles selectively by means of a hazard light. The type of the object is also determined, for example as vehicles, pedestrians, cyclists, animals, etc. Such a vehicle headlight system is also referred to as an automatic lighting assistant, which automatically adjusts the main beam on the basis of the moving and non-moving objects sensed in front of the vehicle. Sensed objects can be extracted from the light distribution, in particular with a "partial full-beam with defined interval". Alternatively, individual objects can also be illuminated more strongly with what is referred to as a hazard light, the intention being to avoid dazzling, without any more detailed description as to how this could happen.

For the human eye it is a difficult task to detect objects such as, for example, pedestrians when driving at night, because the contrast sensitivity of the eye at night is lower than in daylight, and additionally because such objects frequently stand out from their surroundings only with small differences of brightness. Known automatic lighting assistants which direct a spot-beam onto the object in addition to the main beam, solve this problem by attracting the driver's attention to a critical object. However, visually detecting and precisely identifying the illuminated object may still be difficult for the driver owing to the low contrast sensitivity of the human eye and, in certain conditions, the lack of contrast at night. Furthermore, the illumination intensities of spot-beams are subject to legal limits owing to the risk of dazzling others (an on-coming driver or pedestrian, for example). Spot-beams, and, in particular, flashing effects can be misinterpreted by illuminated persons, which may increase the risk of an accident. There is also the risk of an accident if a dazzled animal stops when crossing the roadway.

SUMMARY

In an embodiment disclosed herein, a vehicle adaptive headlight system comprises one or more headlights and an adaptive headlight controller which controls the headlights so as to illuminate a scene visible to a driver. The headlights also generate a frame-region within the scene which outlines an object detected by an object-detection system carried by the vehicle. The frame-region is illuminated at a reduced level relative to the areas of the scene inside and outside the frame-region, thereby creating a dark/light contrast, visible to the driver, between the frame-region and the scene.

The method/system disclosed recognizes that the human eye, with its relatively low contrast sensitivity with respect to images with poor light in a night scene, tends to be attracted by image elements with relatively high light/dark contrasts. Therefore, a frame-region which forms a relatively large and relatively high-contrast element, directs the perception and attention of the driver onto a critical object, but without the risk of dazzling (as may occur in the prior art) if a spot-beam is directed at a person or animal. In addition, the object surrounded in such a way by a dark frame-region can be perceived particularly well by the driver, as will be explained in more detail below.

In another embodiment disclosed herein, a method of operating an adaptive headlight system of a vehicle comprises detecting an object using an object-detecting system, and directing light from at least one headlight to illuminate a scene visible to a driver and to generate a frame-region within the scene outlining the object. The frame-region is illuminated at a reduced level relative to respective areas of the scene inside and outside the frame-region to thereby create a dark/light contrast, visible to the driver, between the frame-region and the scene.

In another embodiment disclosed herein, a method comprises operating an adaptive headlight system of a vehicle to illuminate a scene visible to a driver and to generate a frame-region within the scene. The frame-region outlines an object detected by an object-detection system and is illuminated at a reduced level relative to respective areas of the scene inside and outside the frame-region to create a dark/light contrast, visible to the driver, between the frame-region and the scene.

The line width of the frame-region should preferably be relatively large compared to its overall dimensions. In particular, the size of the area darkened by the frame-region should be not less than one-tenth of the size of the area surrounded by the frame-region, for example.

In one disclosed embodiment, the size of the area darkened by the frame-region is at least one-third of the size of the area surrounded by the frame-region, for example approximately half as large or equal in size. In this case, a considerable additional advantage arises: as soon as the frame-region directs the driver's eyes onto the object, virtually only light from inside the frame-region is incident on the part of the retina with the most acute vision and the eye receives very little disruptive light. This makes it easier for the driver to perceive the object and, if appropriate, identify it as potentially dangerous.

If the object is detected as being a human or animal, the length and width of the frame-region is adjusted so that the body, but not the head, of the living being appears within the area outlined by the frame-region. The head is therefore "covered" by the dark frame-region, as viewed by the driver. The vision of the living being is therefore not dazzled at all. In the case of an animal on the roadway, avoiding dazzling will tend to cause the animal to continue running rather than stop.

If the object is detected as being an inanimate object, the length and width of the frame-region are selected so that the inanimate object can be viewed over its entire surface, so that it can be identified more easily by the driver.

In one embodiment, the illumination intensity within the area which is surrounded by the frame-region is the same as outside the region. This means that no additional light has to be used, such as for example a spot-beam.

In one embodiment, the area bounded by the frame-region is illuminated somewhat more intensively than the scene outside of the frame, similarly to a spot-beam. In such a case, the advantages of the invention are also enjoyed: the directing of the driver's attention on to a critical object and the improvement of the driver's perception.

DETAILED DESCRIPTION

Figure 1:
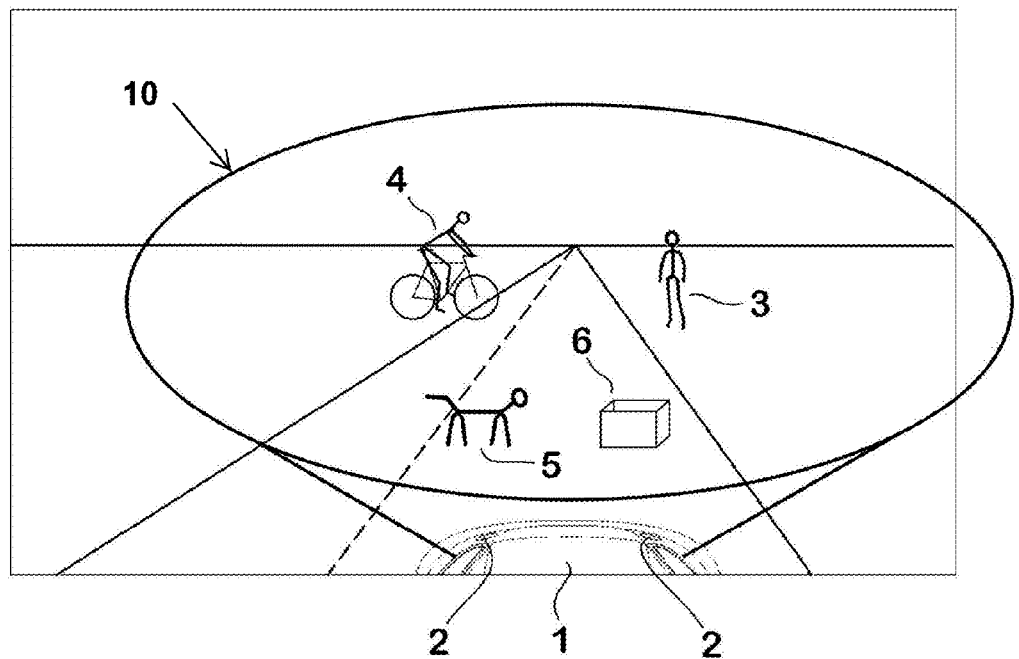
FIG. 1 shows a night scene in front of a motor vehicle with various objects on the road or by the road.

In FIG. 1, a motor vehicle 1 contains two conventional vehicle headlights 2 which combine to project a main beam to illuminate a scene 10 in front of the vehicle and visible to the vehicle driver, the scene containing objects including a pedestrian 3, a cyclist 4, a dog 5, and a crate 6, all of which are located on or nearby the road.

Figure 2:
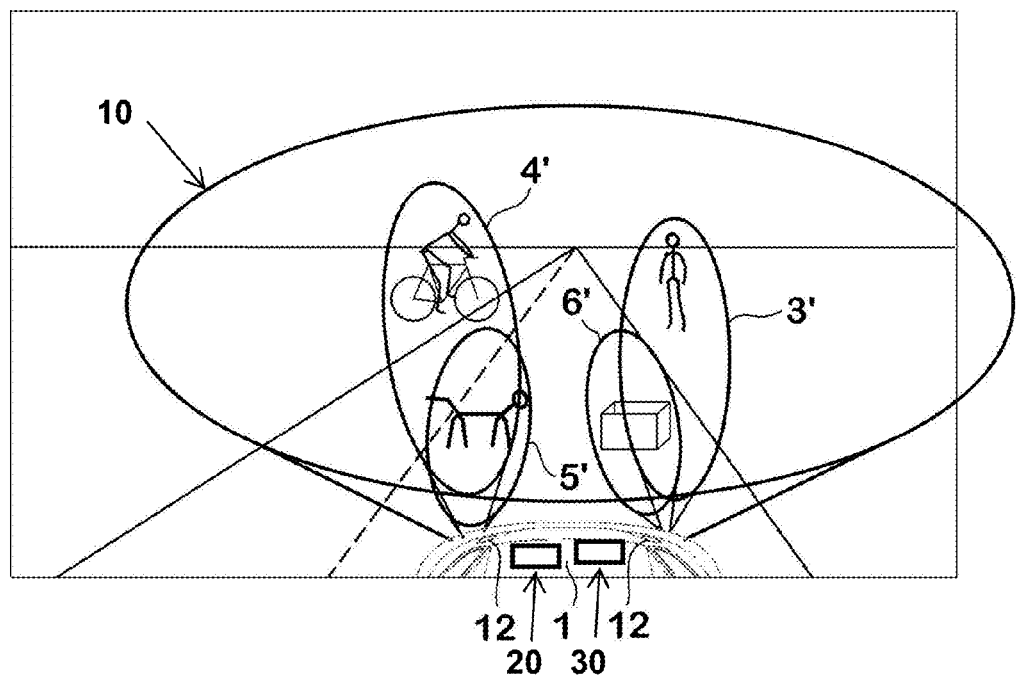
FIG. 2 shows the scene from FIG. 1 with a prior art adaptive headlight system producing spot-beam marking of the objects.

FIG. 2 illustrates a scene corresponding to FIG. 1 but which is illuminated by an adaptive headlight system to produce adaptive light distribution, as taught by the prior art.

In the depicted prior art adaptive light distribution, an adaptive headlight controller 20 controls vehicle headlights 12 to illuminate the overall scene 10 and further direct spot-beams 3', 4', 5' and 6' onto the living beings and/or the inanimate object. To do this, the motor vehicle 1 employs an on-board object-detection system 30 (of the type known in the prior art) comprising one or more remote sensors (cameras, radar sensors, ultrasonic sensors, laser sensors or the like) and an electronic analysis unit using inputs or signals from the sensors to detect and categorize objects in the vicinity of the vehicle.

Figure 3:
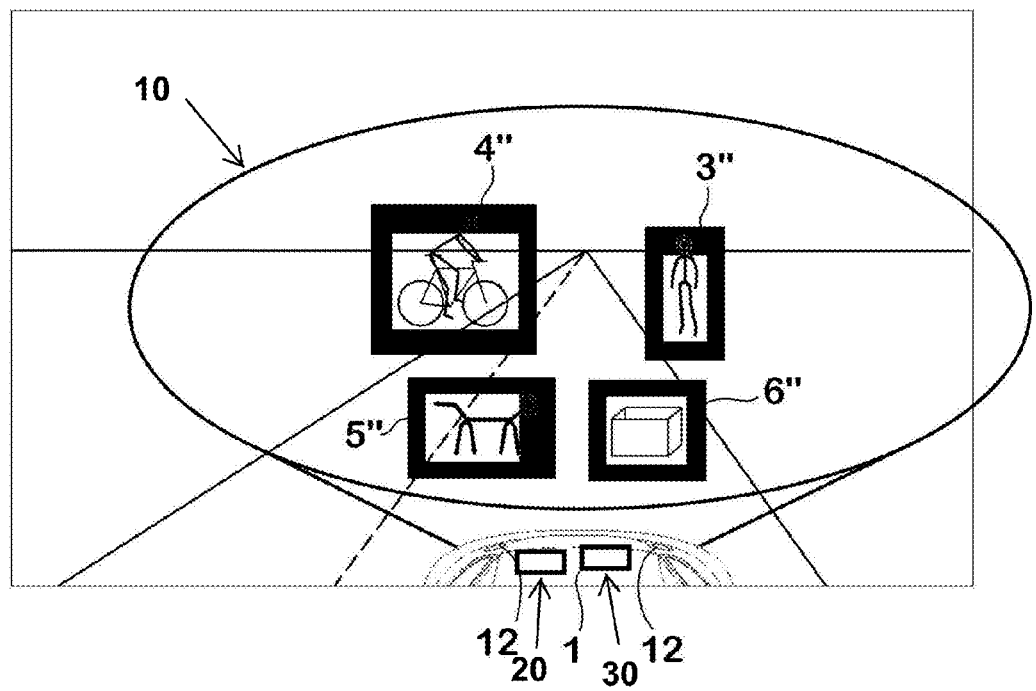
FIG. 3 shows the scene from FIG. 1 with object marking and increasing of contrast by means of dark frames around the objects.

FIG. 3 illustrates a scene 10 corresponding to those of FIGS. 1 and 2 but which is illuminated by an adaptive headlight system with adaptive light distribution according to the present invention. Adaptive headlight controller 20 activates the headlamps 12 to illuminate the overall scene 10, and further to outline the detected living beings and/or inanimate object with darkened frame-regions 3", 4", 5" and 6". The frame-regions are illuminated at a reduced level relative to the illumination of the area outlined or bounded by the frame-regions (this area may be referred to as the object-containing area). The illumination level(s) of the frame-regions is/are also less than that of the scene area outside of the frame-region(s). The frame-regions preferably have zero illumination directed at them by the headlights 12, so as to appear as dark as possible to the driver. This zero or reduced level of illumination of the frame-regions creates a dark/light contrast, visible to the driver, between the frame-region and the rest of the scene, both inside and outside the frame-region. Such a dark/light visible contrast has been found to make the objects within the frame-regions stand out from their surroundings when viewed by a driver.

The disclosed vehicle headlight system co-operates with an object-detection system 30 of the type described above which is operative to detect objects which may represent potential hazards. Preferably, the object-detection system is also capable of differentiating between living beings and inanimate objects, for example on the basis of their movement or lack of movement.

Frame-regions as disclosed herein may be produced by known types of vehicle headlight system in which the illumination can be varied in intensity and/or virtually switched off locally. This can be achieved with a type of "pixel light" such as is generated, for example, by video projectors or what are referred to as beamers, but the pixel resolution does not have to be very high here. In vehicles, primarily headlights with LED arrays and lenses or LED laser arrays are possible for this, as have already been partially implemented, but other types of headlight would also be possible, for example a projection headlight in which shutters in the beam path can be moved, or a laser with just one beam which can be pivoted and quickly switched on and off at the same time.

The frame-region should have as great a light/dark contrast with respect to its background as possible, i.e. the illumination intensity in the frame-region should be as low as possible, preferably zero.

So that the frame-region is understood intuitively by the driver as an indication of a critical object, said frame-region should be a basic geometric shape. While a rectangular frame-region is shown herein, it can, for example, alternatively be an oval or triangle.

It is not necessary for the frame-region to be delineated particularly sharply against the surrounding scene. A certain lack of sharpness or definition may occur, for example, with LED array headlights, whose "pixel resolution" may be close to the line width of the frame-region. Such a lack or sharpness, however, is not expected to significantly degrade effectiveness of the method disclosed herein.

A sufficiently high level of light/dark contrast does not require a frame-region having a continuous, closed perimeter completely surrounding the object. Rather, the frame-region may, for example, be a U-shape or otherwise have interruptions in its outline, as long as the interruptions are small enough that the frame-region still gives the overall visual impression of distinctly separating, bounding, or outlining the framed area from the surrounding scene.

A human eye which is not looking directly at the frame-region but instead has the frame-region within its peripheral field of vision does not perceive such lack of sharpness or interruptions at all, but instead the frame-region is perceived as having a high contrast relative to its background, and as soon as the eye looks into the frame, even an unfocused or interrupted dark frame-region improves the perception of objects as explained above.

In order to avoid visual "dazzling" of living beings, the heads of those beings should not be illuminated. For this purpose, approximately one-fifth of the area of a rectangular image region which outlines or bounds a living being also remains unilluminated, with the result that the frames 3", 4", 5" are correspondingly thicker in these portions. In the case of a two-legged being and a cyclist, the upper one-fifth may be darkened. In the case of a four-legged being, one-fifth is darkened on the side (left or right, as viewed by the driver) at which the beings head is detected to be located. This may be apparent from the being's direction of movement. If a living being or inanimate object is moving, the frame-region 3", 4", 5" and 6" is correspondingly tracked in a running fashion.

Figure 4:
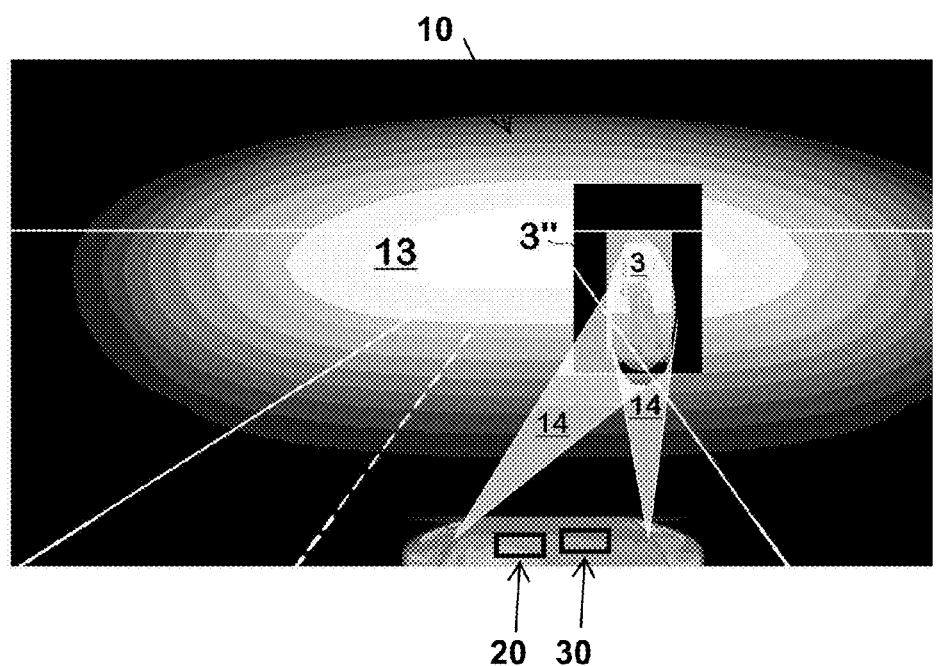
FIG. 4 shows the scene from FIG. 3, only with the pedestrian and in a somewhat more realistic illustration.

FIG. 4 illustrates an exemplary embodiment in which the vehicle headlights generate, in addition to a wide-area light cone or main beam 13 providing illumination of the overall scene ahead of the vehicle, two spot-beams 14 with narrowly-focused light cones with which the body of a pedestrian 3 is either additionally or exclusively illuminated. In either case, the pedestrian's body is surrounded by a relatively darkened frame-region 3".

With reference to FIG. 4, it becomes apparent that a driver who is not looking at the pedestrian 3 becomes, in this way, more aware of the contrast-rich pedestrian 3 than with conventional spot-beam marking (of the general type shown in FIG. 2). Also, as soon as the driver looks directly at the pedestrian 3, said driver can identify a pedestrian 3 more easily as such because the pedestrian 3 is perceived in a more contrast-rich fashion within the frame-region 3" than without such a frame-region 3".

What is claimed is:

1. A vehicle headlight system comprising:
a headlight; and
an adaptive headlight controller causing the headlight to illuminate a scene visible to a driver and to generate a frame-region within the scene and outlining an object detected by an object-detection system, the frame-region illuminated at a reduced level relative to respective areas of the scene inside and outside the frame-region and creating a dark/light contrast, visible to the driver, between the frame-region and the scene.

2. The vehicle headlight system of claim 1, wherein the frame-region has a shape of a basic geometric shape.

3. The vehicle headlight system of claim 1, wherein if the object-detecting system indicates that the object is a living being the frame-region is located to cover a head of the living being.

4. The vehicle headlight system of claim 1, wherein if the object-detecting system indicates that the object is inanimate the frame-region is generated such that the object appears to fill the area outlined by the frame-region.

5. The vehicle headlight system of claim 1, wherein an illumination level inside the frame-region is approximately equal to an illumination level outside the frame-region.

6. The vehicle headlight system of claim 1, further comprising directing a spot-beam to illuminate the area of the scene inside the frame-region at an illumination level greater than an illumination level outside the frame-region.

7. A method of operating an adaptive headlight system, comprising:
detecting an object using an object-detecting system; and
directing light from a headlight to illuminate a scene visible to a driver and to generate a frame-region within the scene outlining the object, the frame-region illuminated at a reduced level relative to respective areas of the scene inside and outside the frame-region and creating a dark/light contrast, visible to the driver, between the frame-region and the scene.

8. The method of claim 7, wherein the frame-region has a shape of a basic geometric shape.

9. The method of claim 7, wherein if the object-detecting system indicates that the object is a living being the frame-region is located to cover a head of the living being.

10. The method of claim 7, wherein if the object-detecting system indicates that the object is inanimate the frame-region is generated such that the object appears to fill the area outlined by the frame-region.

11. The method of claim 7, wherein an illumination level inside the frame-region is approximately equal to an illumination level outside the frame-region.

12. The method of claim 7, further comprising directing a spot-beam to illuminate the area of the scene inside the frame-region at an illumination level greater than an illumination level outside the frame-region.

13. A method comprising:
operating an adaptive headlight system of a vehicle to illuminate a scene visible to a driver and to generate a frame-region within the scene and outlining an object detected by an object-detection system, the frame-region illuminated at a reduced level relative to respective areas of the scene inside and outside the frame-region and creating a dark/light contrast, visible to the driver, between the frame-region and the scene.

14. The method of claim 13, wherein the frame-region has a shape of a basic geometric shape.

15. The method of claim 13, wherein if the object-detecting system indicates that the object is a living being the frame-region is located to cover a head of the living being.

16. The method of claim 13, wherein if the object-detecting system indicates that the object is inanimate the frame-region is generated such that the object appears to fill the area outlined by the frame-region.

17. The method of claim 13, wherein an illumination level inside the frame-region is approximately equal to an illumination level outside the frame-region.

18. The method of claim 13, further comprising directing a spot-beam to illuminate the area of the scene inside the frame-region at an illumination level greater than an illumination level outside the frame-region.

* * * * *